United States Patent
Haustein et al.

(10) Patent No.: US 7,826,329 B2
(45) Date of Patent: Nov. 2, 2010

(54) MULTI-LAYERED MEDIA ABERRATION COMPENSATION APPARATUS, METHOD, AND SYSTEM

(75) Inventors: Nils Haustein, Zornheim (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 11/242,987

(22) Filed: Oct. 4, 2005

(65) Prior Publication Data

US 2007/0076564 A1 Apr. 5, 2007

(51) Int. Cl.
G11B 7/135 (2006.01)
(52) U.S. Cl. ................... 369/112.02; 369/44.32
(58) Field of Classification Search ............. 369/112.02
See application file for complete search history.

(56) References Cited

U.S. PATENT DOCUMENTS

| | | | | |
|---|---|---|---|---|
| 4,572,616 A | * | 2/1986 | Kowel et al. | 349/200 |
| 4,937,539 A | * | 6/1990 | Grinberg et al. | 349/202 |
| 5,151,814 A | * | 9/1992 | Grinberg et al. | 359/209.1 |
| 6,250,550 B1 | * | 6/2001 | Winarski et al. | 235/383 |
| 6,317,190 B1 | * | 11/2001 | Winarski et al. | 349/200 |
| 6,347,742 B2 | * | 2/2002 | Winarski et al. | 235/462.35 |
| 7,057,700 B2 | * | 6/2006 | Sugimoto et al. | 349/172 |
| 2001/0002033 A1 | * | 5/2001 | Winarski et al. | 235/383 |
| 2005/0094506 A1 | * | 5/2005 | Shihara et al. | 369/44.26 |

OTHER PUBLICATIONS

U.S. Appl. No. 10/118,583, filed Apr. 8, 2002, Katsuhiko Yasuda, et al.
U.S. Appl. No. 10/156,115, filed May 29, 2002, Mitsuhiro Togashi, et al.
U.S. Appl. No. 10/346,464, filed Jan. 17, 2003, Hiroyasu Yoshikawa, et al.
U.S. Appl. No. 09/035,130, filed Mar. 5, 1998, Masakazu Ogasawara.
U.S. Appl. No. 09/478,760, filed Jan. 6, 2000, Hiroyasu Yoshikawa, et al.

* cited by examiner

*Primary Examiner*—Hoa T Nguyen
*Assistant Examiner*—Mark L Fischer
(74) *Attorney, Agent, or Firm*—Kunzler Needham Massey & Thorpe (57) ABSTRACT

An apparatus, system, and method are disclosed for aberration compensation. In one embodiment, a first compensation lens used in conjunction with a second compensation lens to produce a conical beam used to read from, or write to, an optical medium. An $N^{th}$ order compensation equation is used to optimize aberration errors associated with accessing the optical medium. The present invention may include a displaceable focus lens positioned relative to an optical medium. The focus lens may be displaced when the conical beam's focal length is adjusted. A displacement equation is presented to determine the preferred placement of the focus lens. By compensating for aberration, read/write errors may be reduced while accessing optical media thus increasing system robustness and facilitating the use of additional layers on optical media.

13 Claims, 6 Drawing Sheets

| 303<br>C1-δC,C5-δC | 304<br>C1,C5-δC | 305<br>C1+δC,C5-δC |
|---|---|---|
| 302<br>C1-δC,C5 | 301<br>C1,C5 | 306<br>C1+δC,C5 |
| 309<br>C1-δC,C5+δC | 308<br>C1,C5+δC | 307<br>C1+δC,C5+δC |

↑ 310

| 313<br>C2-δC,C6-δC | 314<br>C2,C6-δC | 315<br>C2+δC,C6-δC |
|---|---|---|
| 312<br>C2-δC,C6 | 311<br>C2,C6 | 316<br>C2+δC,C6 |
| 319<br>C2-δC,C6+δC | 318<br>C2,C6+δC | 317<br>C2+δC,C6+δC |

↑ 320

| 323<br>C3-δC,C7-δC | 324<br>C3,C7-δC | 325<br>C3+δC,C7-δC |
|---|---|---|
| 322<br>C3-δC,C7 | 321<br>C3,C7 | 326<br>C3+δC,C7 |
| 329<br>C3-δC,C7+δC | 328<br>C3,C7+δC | 327<br>C3+δC,C7+δC |

↑ 330

| 333<br>C4-δC,C8-δC | 334<br>C4,C8-δC | 335<br>C4+δC,C8-δC |
|---|---|---|
| 332<br>C4-δC,C8 | 331<br>C4,C8 | 336<br>C4+δC,C8 |
| 339<br>C4-δC,C8+δC | 338<br>C4,C8+δC | 337<br>C4+δC,C8+δC |

MULTI-LAYERED MEDIA ABERRATION COMPENSATION APPARATUS, METHOD, AND SYSTEM

BACKGROUND OF THE INVENTION

1. Field of the Invention

This invention relates to aberration compensation and more particularly relates to apparatus, methods, and systems for compensating for aberration when accessing an optical medium.

2. Description of the Related Art

Optical media have become increasing pervasive in digital systems. Movies, pictures, and other familiar content, as well as software programs, drivers, and data can all be stored in a non-volatile manner on optical media. Because the use of optical media is so flexible and pervasive, the motivation to increase storage density has increased. One approach to increasing the storage density of optical media involves the use of multiple data layers.

Accessing an optical media with multiple layers is typically accomplished by using a single laser and selecting a unique intensity for each data layer. For example, one intensity is set for the data layer closest to the laser, another intensity is set for the data layer farthest from the laser, and likewise for each data layer therebetween. Although the laser has multiple intensities to accommodate each data layer, the laser is typically set at a fixed focal length resulting in increased data error rates over single layer optical media.

Additional challenges result from the variability in optical characteristics from disk to disk and layer to layer. For example, variation in material composition or thickness may result in changes in the refractive index of the media and the desired focal point of the laser. Thus, the variability in optical characteristics and variation in layer depth as well as other factors result in increased aberration errors for multi-layered media.

From the foregoing discussion, it should be apparent that a need exists for an apparatus, system, and method that compensates for aberration on a layer by layer basis. Beneficially, such an apparatus, system, and method would reduce errors when accessing optical media and increase system robustness and performance.

SUMMARY OF THE INVENTION

The present invention has been developed in response to the present state of the art, and in particular, in response to the problems and needs in the art that have not yet been fully solved by currently available aberration compensation systems used in conjunction with an optical data storage system. Accordingly, the present invention has been developed to provide an apparatus, system, and method for aberration compensation that overcome many or all of the above-discussed shortcomings in the art.

The apparatus to compensate for aberration, in one embodiment, includes a compensation lens comprising a plurality of compensation planes interleaved with a plurality of electrodes. Each compensation plane has a refractive index which varies according to a voltage applied across electrodes adjacent to it. A voltage source provides a plurality of compensation voltages to the electrodes. Each compensation voltage may be a function of a plane index. In one embodiment, the compensation voltages substantially conform to an $N^{th}$ order compensation equation wherein all odd terms of the compensation equation are substantially equal to zero.

The apparatus, in one embodiment, has a second compensation lens that is substantially identical to the first and axially rotated to provide additional compensation. The compensation lenses may be used in combination to provide both vertical and horizontal compensation (or the like) of any aberrations within the media or optical elements associated therewith.

In one embodiment, the compensation voltages conform to discrete compensation equation such as a quadratic, fourth order, sixth order, or eighth order equation. In one embodiment, the compensation equation is the following discrete eighth order equation, namely $Vi = C1*i^2 + C2*i^4 + C3*i^6 + C4*i^8$. An optimization module may optimize the compensation equation (for example in response to data errors) by perturbing the coefficients of the compensation equation. In one embodiment, perturbing the coefficients of the compensation equation proceeds from the lowest order coefficients to the highest order coefficients (as needed) in order to eliminate data errors.

A focus lens may also be included in the apparatus. In certain embodiments, the focus lens is adjustable in position and may be adjusted in conjunction with a change in focal length of the first and second compensation lenses. In one embodiment, the displacement of the focus lens is determined by several factors such as, a distance between an axial midpoint of the first and second compensation lens and the focus lens ('Dc'), a distance between the axial midpoint of the first and second compensation lens and a laser ('Ds'), a focal length of the first and second compensation lenses in combination ('F1') and a focal length of the focus lens ('F2'). In one embodiment, a distance Dm from the focus lens to a data layer m in an optical media is adjusted to substantially conform to the equation $Dm = [F2*Dc - F2*Ds*F1/(Ds-F1)]/[Dc - F2 - Ds*F1/(Ds-F1)]$.

A system of the present invention is also presented to compensate for aberration. The system may be embodied in a device used to access an optical medium. In particular, the system, in one embodiment, includes an optical head which is able to emit a beam of light, a focus lens, an optical medium, a compensation lens encompassing a plurality of electrodes, a voltage source configured to provide a plurality of compensation voltages. In one embodiment, the compensation voltages substantially conform to an $N^{th}$ order compensation equation wherein all odd terms of the compensation equation are substantially equal to zero.

The system may further include a second compensation lens that is identical in composition to the first. The two lenses may be utilized in combination by aligning them coaxial with a transparent spacer configured to separate them in a substantially parallel manner. A focus lens may also be included in the apparatus. In one embodiment, the focus lens is adjustable in position responsive to a change in focal length of the first and second compensation lenses.

The displacement of the focus lens may determined by several factors such as, a distance between an axial midpoint of the first and second compensation lens and the focus lens ('Dc'), a distance between the axial midpoint of the first and second compensation lens and a laser ('Ds'), a focal length of the first and second compensation lenses in combination ('F1') and a focal length of the focus lens ('F2'). In one embodiment, the displacement conforms to the equation $Dm = [F2*Dc - F2*Ds*F1/(Ds-F1)]/[Dc - F2 - Ds*F1/(Ds-F1)]$ where Dm is the distance from the focus lens to a data layer m in an optical media.

A method of the present invention is also presented to compensate for aberration. The method in the disclosed embodiments substantially includes the steps necessary to carry out the functions presented above with respect to the operation of the described apparatus and system. In one embodiment, the method includes interleaving a plurality of electrodes with a plurality of compensation planes and providing a compensation voltage across each compensation plane. The method also may include adjusting a refractive index corresponding to each compensation plane by providing compensation voltages that conform to an $N^{th}$ order compensation equation wherein all odd terms of the compensation equation are substantially equal to zero. The method may further include optimizing the compensation equation to reduce aberration error.

The various embodiments of the present invention may provide particular advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognized that the invention may be practiced without one or more of the specific features of a particular embodiment. In other instances, additional features and advantages may be recognized in certain embodiments that may not be present in all embodiments of the invention.

These features and advantages of the present invention will become more fully apparent from the following descriptions and appended claims, or may be learned by the practiced of the invention as set fourth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been explicitly labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
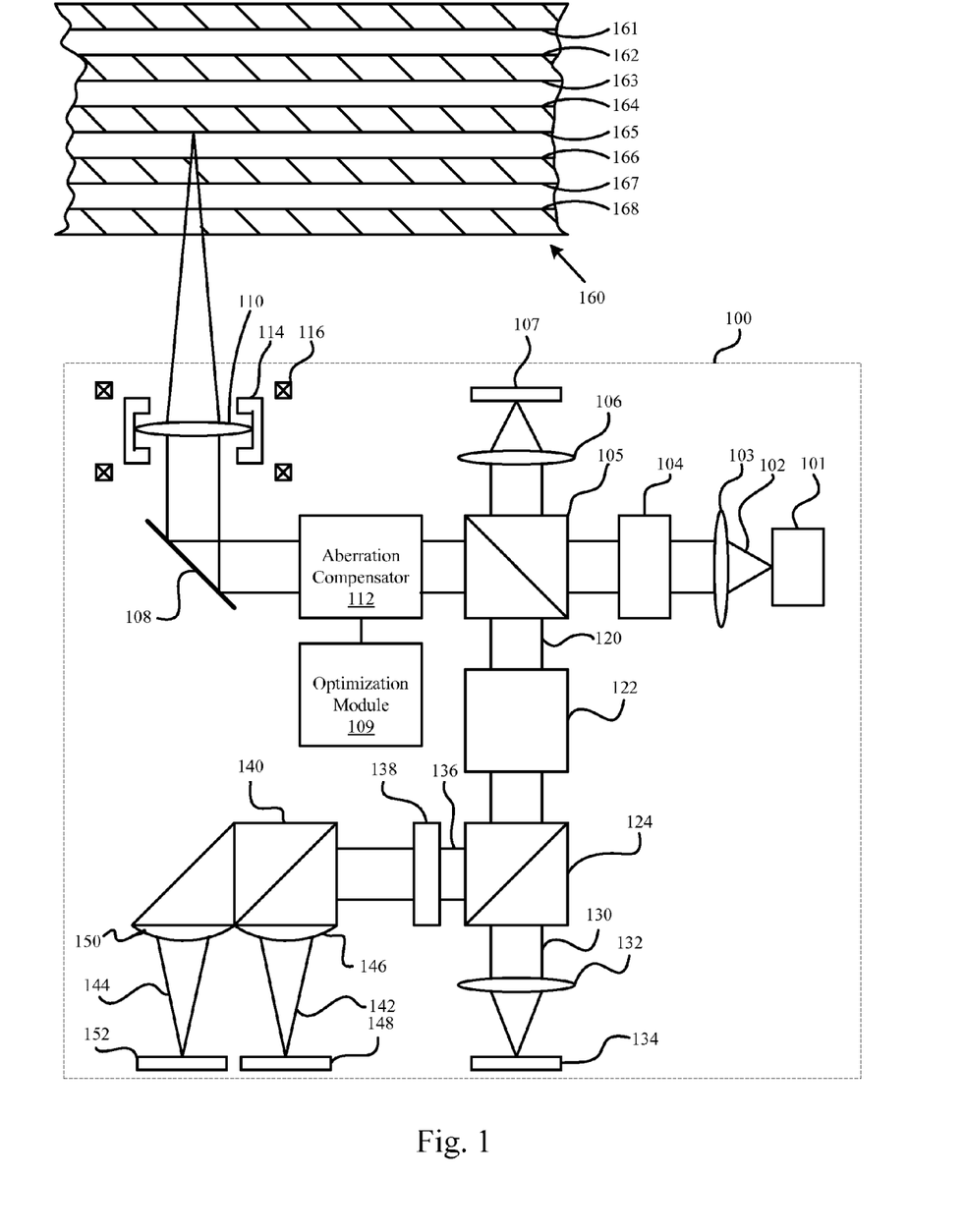
FIG. 1 is a side view of one embodiment of an optical head with an optical medium in accordance with the present invention.

FIG. 1 is a schematic diagram of one particular embodiment of an optical head 100 and optical medium 160. To communicate the distinctive features of the present invention, the elements cited in the claims attached hereto are depicted in particular embodiments within the attached Figures (including FIGS. 1 and 2) in a manner that facilitates comprehension and discussion. Specific dimensions included for discussion purposes are not intended to limit the scope of the claims. One of skill in the art will also appreciate that various configurations and implementations may be derived that conform to the inventive concepts communicated herein.

As depicted, optical head 100 includes a laser 101. Laser 101 may be a gallium-aluminum-arsenide or similar diode laser which produces a primary beam of light 102. In one particular embodiment, beam 102 is a blue-laser light source with a wavelength 405 nm. In another particular embodiment, beam 102 is a red-laser light with a wavelength of 650 nm. In yet another particular embodiment, beam 102 is an infra-red laser light with a wavelength of 780 nm. Beam 102 may be any wavelength of light or combination of wavelengths capable of accessing optical medium. Beam 102 is collimated by lens 103 and is circularized by a circularizer 104 which may be a circularizing prism. Beam 102 passes to a beamsplitter 105.

In the depicted embodiment, a portion of beam 102 is reflected by beamsplitter 105 to an aberration compensator 112 and an optical detector 107. Laser light focused by lens 106 onto detector 107 may be used to monitor the intensity of beam 102. An optimization module 109 may monitor aberration error directly or indirectly to make various adjustments to reduce aberration errors via the aberration compensator 112. The rest of beam 102 passes to and is reflected by mirror 108 through focus lens 110 onto optical medium 160.

Optical medium 160 may include a plurality of data surfaces. In the depicted embodiment, beam 102 passes through a focus lens 110 and is focused onto one of eight data surfaces 161 thru 168 of optical medium 160. The target layer is surface 165, in FIG. 1. Focus lens 110 is mounted in a holder 114. The position of holder 114 may be adjusted relative to optical medium 160 by a focus actuator motor 116. In one embodiment, focus actuator motor 116, is a voice coil motor.

In the depicted embodiment, a portion of beam 102 may be reflected by targeted data surface 165 as reflected beam 120. Beam 120 subsequently returns through lens 110, is reflected by mirror 108, and passes through compensator 112. At beamsplitter 105, beam 120 is reflected to a multiple data surface filter 122. The beam 120 also passes through filter 122 and passes to a beamsplitter 124. At beamsplitter 124 a first portion 130 of beam 120 is directed to an astigmatic lens 132 and a quad optical detector 134. At beamsplitter 124, a second portion 136 of beam 120 is directed through a half-wave plate 138 to a polarizing beamsplitter 140. Beamsplitter 140 separates light beam 136 into a first orthogonal polarized light component 142 and a second orthogonal polarized light component 144. A lens 146 focuses light 142 to an optical detector 148 and a lens 150 focuses light 144 to an optical detector 152.

Figure 2:
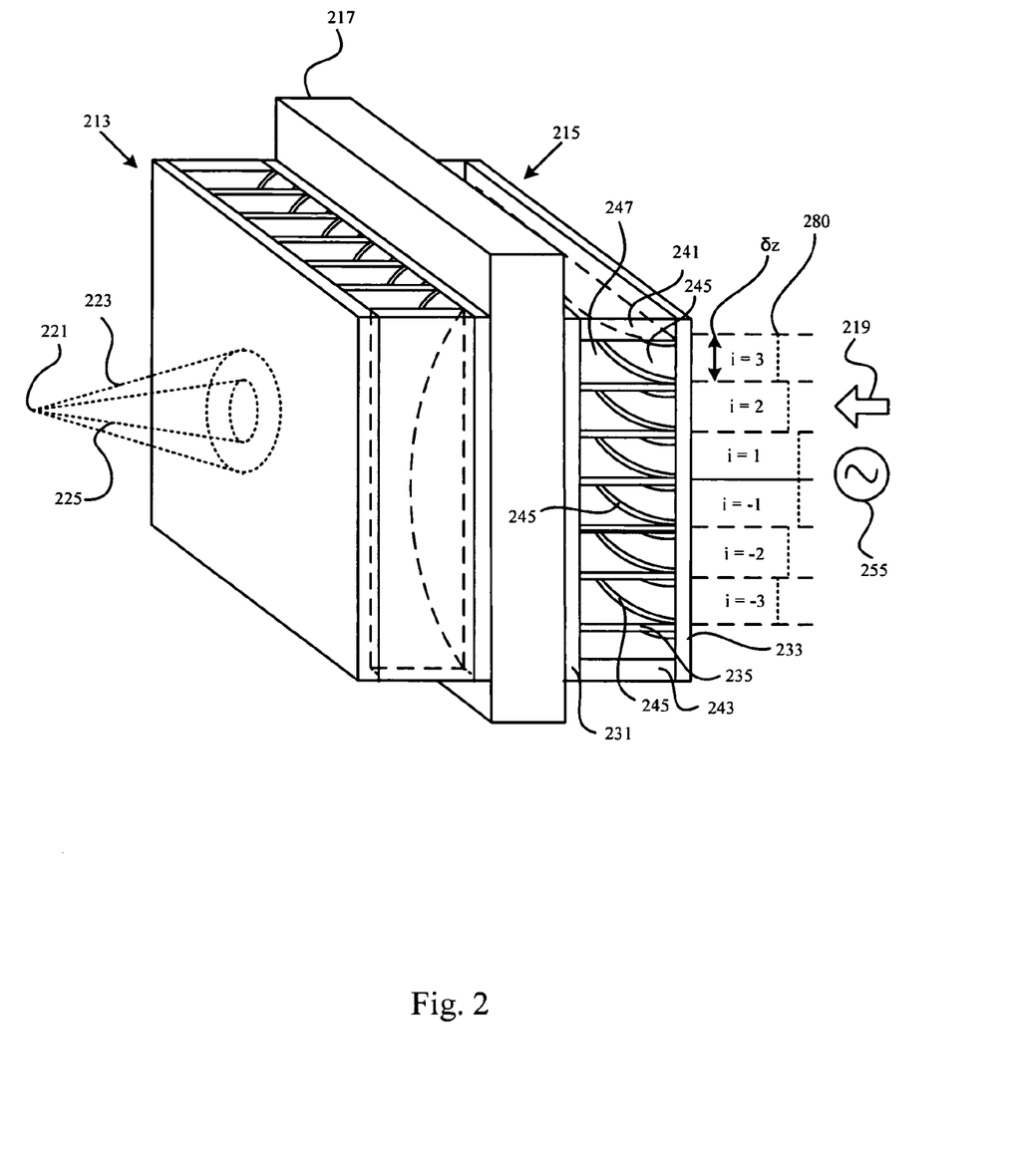
FIG. 2 is a perspective view of one embodiment of an aberration compensator in accordance with the present invention.

FIG. 2 depicts one embodiment of a lens assembly 200. Lens assembly 200 comprises a front compensation lens 213, a rear compensation lens 215, and a transparent spacer plate 217 positioned therebetween. Lens assembly 200 is one example of the aberration compensator 112 depicted in FIG. 1.

In the depicted embodiment, a beam of light 219 is projected into rear lens 215 from right to left. Beam 219 may be independently focused by compensation lenses 213, 215 into conical beams 223, 225, respectively, and focused to a common point 221 to the left of front lens 213.

In one embodiment, the thickness of spacer plate 217 is selected to be one half of one wavelength of beam 219. Beam 219 may be any wavelength of laser light or combination of wavelengths capable useful for accessing the optical medium. The depicted compensation lenses 213, 215 are substantially identical in construction and rotated 90 degrees along the optical axis. For simplicity, only lens 215 will be discussed even though the following description applies equally to lens 213.

The depicted lens 215 includes a pair of parallel, glass plates, 231, 233, and a plurality of thin, rectangular, insulative, polymer films 235 therebetween. In one particular embodiment, plates 231, 233 are one mm squares, the inner surfaces of plates 231, 233 are spaced apart by seventy microns which is also the width of the films 235, and each film 235 has a length of one mm and a thickness of two microns.

In the depicted embodiment, a pair of glass substrates 241, 243 are located at the upper and lower ends, respectively, of lens 215 with films 235 layered therebetween. Films 235 and substrates 241, 242 are substantially parallel to one another, and substantially perpendicular to plates 231, 233. In one embodiment, films 235 and substrates 241, 243 are evenly spaced at approximately fifty micron intervals.

To facilitate comprehension, the depicted lens assembly 200 includes five films 235 interleaved with six layers of a variable refractive index material 247 (such as a liquid crystal) and positioned between substrates 241, 243. Each layer of variable refractive index material 247 is referred to herein as a compensation plane. In some embodiments, there are an equal number of layers of the refractive material above and below the centerline of the lens 213. In the depicted illustration each compensation plane is labeled with a layer index i (namely −3, −2, −1, 1, 2, 3) to denote the six layers shown. With a 50 micron layer-to-layer interval and a one mm square compensation lens, the actual number of layers would be approximately twenty, (1000/50).

The upper and lower surfaces of each film 235 and the inner surfaces of substrates 241, 243 have an electrode 245 formed on them. In the embodiment shown, electrodes 245 are semi-circular in shape with a radius of two mm. In another embodiment, electrodes 245 may be formed in any other shape that also would produce a positive focal length. Electrodes 245 may have a thickness that is less than ten nm, but they are shown much thicker for illustration purposes. Electrodes 245 may be sputtered to the desired shape with a patterned mask, or sputtered over the entire rectangular surface of films 235 and substrates 241, 243, and then chemically etched with a patterned photo-resist to obtain the desired shape. Other processes, such as photolithography, may also be used to obtain the desired pattern for electrodes 245.

After electrodes 245 are formed, an alignment material (not shown) such as polyimide may be spin-coated or printed on top of the electrodes and the remaining surface area of the underlying substrate. However, any material for homogenous parallel alignment, such as polyvinyl alcohol, may be used. The alignment material has a thickness of thirty nm or less. After the alignment material has coated the electrodes and their substrates, an alignment process, such as rubbing, is performed on the alignment material to set the desired alignment direction for the liquid crystals. Other alignment processes, such as photoalignment, which establish parallel homogenous alignment, may also be used.

The films 235 may be mounted in spacers (not shown) to maintain their spacing which in the depicted embodiment is approximately 50 microns. The spacing between films 235 could be larger or smaller, as long as the alignment effect is maintained. The films 235, substrates 241, 243, and plates 231, 233 are then assembled together to form lens 213 before the refractive material 247 is injected into the spacers or cells. In one embodiment, the refractive material 247 is a liquid crystal.

In one embodiment, a voltage 255 is applied to produce a selected refractive index for the refractive material 247 for each compensation plane in lenses 213, 215. Each compensation plane may have a different voltage 255 to produce a refractive index for that layer, so that a common focus point 221 is achieved. The voltage across each compensation plane may be constant, resulting in a stepped voltage profile 280.

In one embodiment, the total thickness of each film 235, including an electrode 245 and outer layer of alignment material on each surface (which are substantially negligible at twenty nm and sixty nm total) is approximately two microns. Assuming one film 235 for every fifty microns of transmission width, the amount of light transmitted by lens assembly 200 may be diminished by only four percent (4%) per lens 213, 215, or eight percent (8%) total. In one embodiment, the value of δz is fifty-two microns distinguished as fifty microns for the liquid crystal plus two microns for the film.

Figure 3:
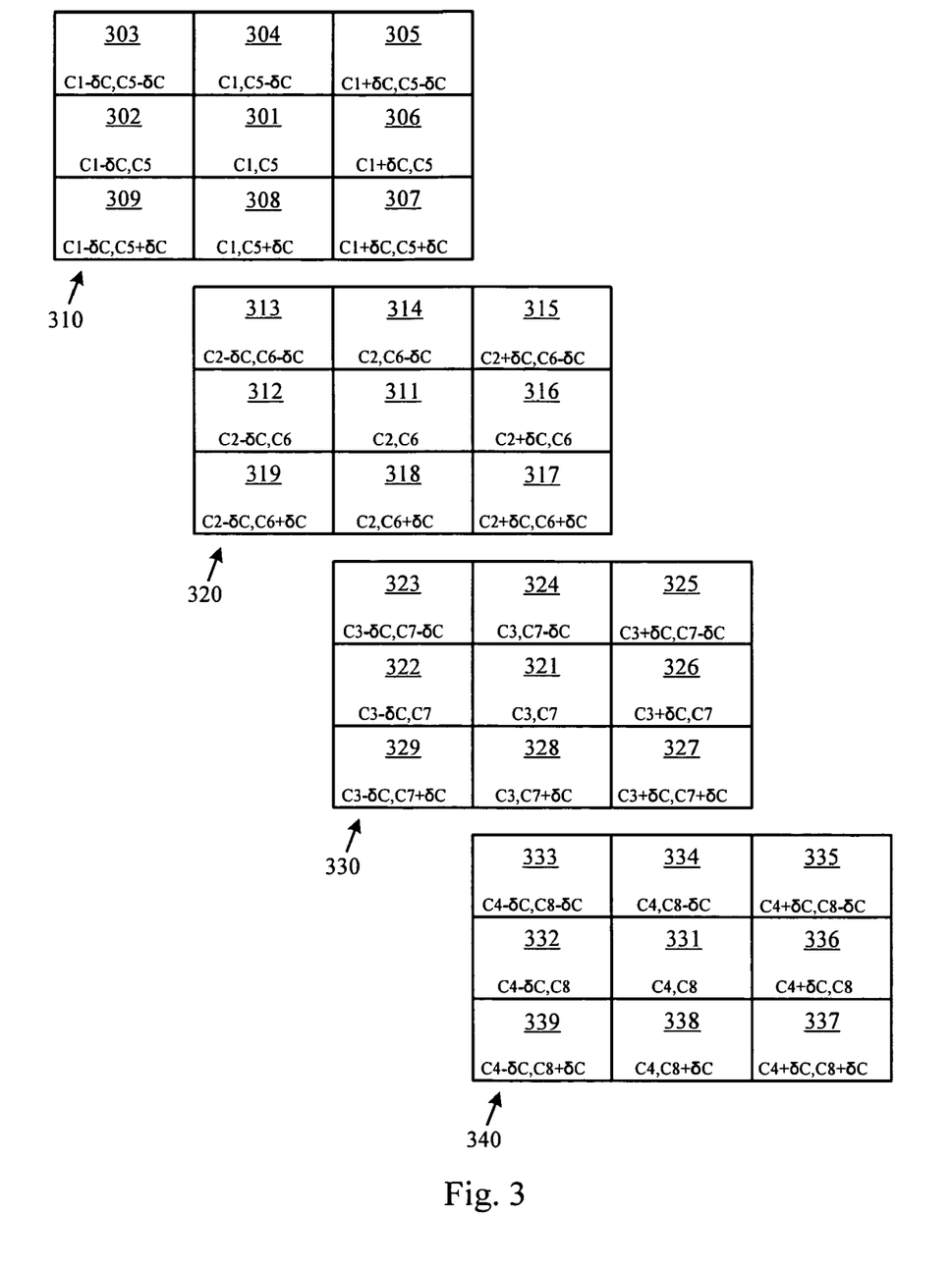
FIG. 3 is a chart of one embodiment of search matrices in accordance with the present invention.

FIG. 3 illustrates a set of search matrices 300 to perturb coefficients for aberration compensation in accordance with the present invention. The search matrices include a matrix of quadratic coefficients 310, a matrix of fourth-order coefficients 320, a matrix of sixth-order coefficients 330, and a matrix of eighth-order coefficients 340. The search matrices 300 may be used by the optimization module 109 to optimize an Nth order compensation equation used to provide the compensation voltages to the aberration compensator 112. In the depicted embodiment, the search matrices 300 correspond to an $8^{th}$ order compensation equation. While only a 3×3 submatrix is shown for purposes of illustration, search matrices 300 may be of any appropriate size.

Matrix 310 may have coefficient values 301 shown as C1 and C5. In the depicted embodiment, coefficient values 301 represents the current quadratic coefficients used to generate the compensation voltages for compensation lenses 213 and 215 respectively. Index 301 may have neighboring cells 302-309. Cells 302-309 represent possible offsets from the current coefficients in index 301.

Similarly, search matrices 320, 330, 340 may have indices 311, 321, 331 respectively. In the depicted embodiment, indices 311, 321, 331 represent the current fourth-order, sixth-order, and eight-order coefficients, respectively, used to generate the compensation voltages and compensate for aberration errors in the optical head 100 and optical medium 160. Indices 311, 321, 331 may have neighboring cells 312-319, 322-329, 332-339 respectively. In the depicted embodiment, cells 312-319, 322-329, 332-339 are possible offsets from the current coefficients in indices 311, 321, 331.

The coefficients of indices 301, 311, 321, 331 may be offset by a value, δC. δC may be different for each search matrix. In one embodiment, δC corresponds to the finest resolution achievable for the compensation voltages. In another embodiment, δC is initially set at a coarse resolution and subsequently set to a finer resolution to increase the optimization resolution. As depicted, each cell of the search matrices 300 represents two coefficients, one coefficient is for aberration compensation of the first liquid crystal lens and one is for aberration compensation of the second liquid crystal lens. When selecting new coefficients for aberration compensation, at least one of the coefficients of the neighboring cells may be perturbed by a value, δC.

If each lens of aberration compensator 200 is substantially identical in construction, an aberration compensation equation may be derived for independently focusing light into a conical beam which has a common algebraic form for both lenses. For simplicity, two equations will be presented using distinguishing variables for the coefficients. For lens 215, the discrete equation for aberration compensation of light into a conical beam is represented herein as $C1*i2+C2*i4+C3*i6+C4*i8$. Likewise, for lens 213, the discrete equation for aberration compensation of light into a conical beam is represented herein as $C5*i2+C6*i4+C7*i6+C8*i8$. In the discussed embodiments, odd powers of layer index i are excluded to ensure the step-voltage profile 280 is symmetric about the centerline of lens 213, 215.

In one embodiment, the optimization module 109 first perturbs the quadratic coefficients C1 and C5 via search matrix 310. The coefficients C1 and C5 may be offset by adding or subtracting a value, δC, from at least one of the coefficients according to the search matrix 310 until aberration is minimized. In one embodiment, when additional compensation is needed, coefficients of the next higher ordered term are perturbed in accordance with the corresponding matrix 320, 330, 340.

Figure 4:
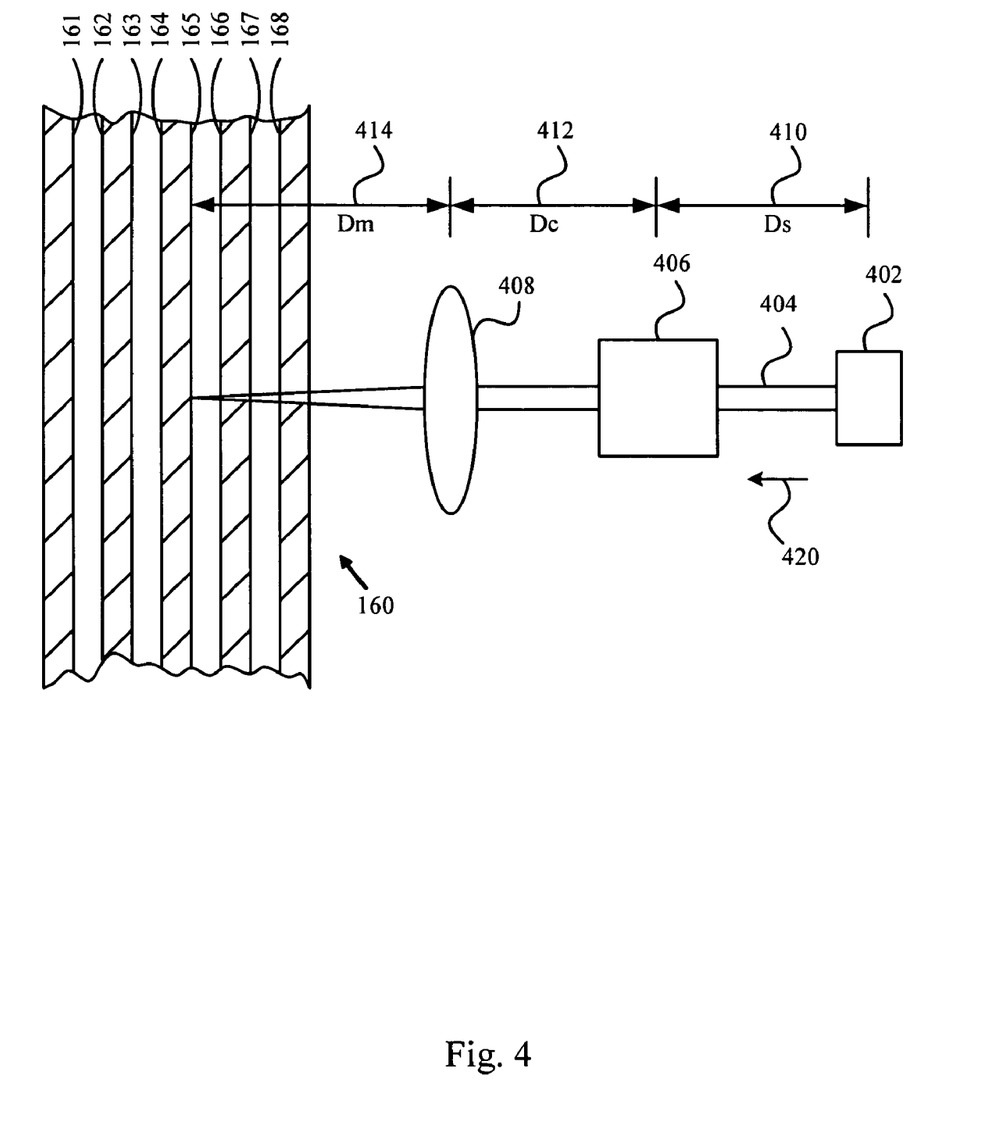
FIG. 4 is a schematic diagram of a consolidated optical head with an optical medium in accordance with the present invention.

FIG. 4 is a consolidated depiction of optical head 100 with optical medium 160. Some components of optical head 100 have been omitted to ease illustration. The consolidated optical head 400 includes a laser diode 402, a laser beam 404, a variable aberration compensator 406, and a focus lens 408. The depicted spacings include a distance 410 ('Ds') between laser diode 402 and variable aberration compensator 404, a distance 412 ('Dc') between variable aberration compensator 406 and focus lens 408, a distance 414 ('Dm') between focus lens 408 and a data layer on optical medium 160, and a direction 420.

As depicted, laser diode 402 emits a beam of light 404 in direction 420. Beam 404 passes through variable aberration compensator 406, then focus lens 408, and is focused onto a data layer on optical medium 160, where data layer 165 as depicted as the target layer. In one embodiment, the focus lens 408 is moveable by a voice coil motor so as to be closer to or further from the optical medium. Focus lens 408 has a focal length, F2, and variable aberration compensator 406 has a focal length, F1. When the focal length of the aberration compensator is altered, the distance 414 may require adjustment. The adjustment to distance 414 may be made according to the equation Dm=[F2*Dc−F2*Ds*F1/(Ds−F1)]/[Dc−F2−Ds*F1/(Ds−F1)]. Adjusting according to the particular equation facilitates focusing the head 100 to a different layer 165 of the optical medium 160 independent of the current aberration compensation coefficients.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Additionally, the order in which a particular method occurs may or may not strictly adhere to the order of the corresponding steps shown.

Figure 5:
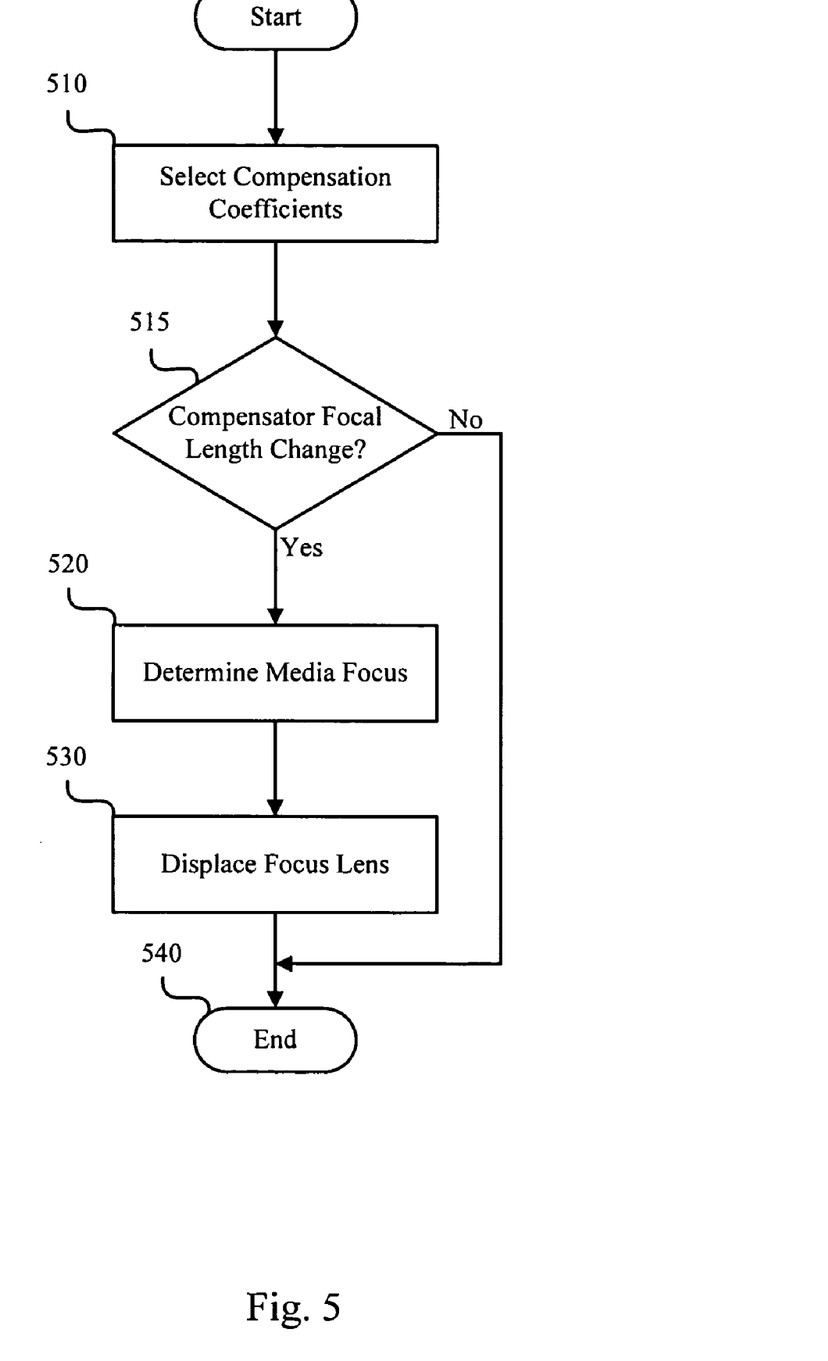
FIG. 5 is a schematic flow chart diagram illustrating one embodiment of a aberration compensation method of the present invention.

FIG. 5 depicts one embodiment of a compensation method 500 of the present invention. The depicted method 500 includes selecting 510 coefficients to compensate for aberration, determining 520 the media focus, and displacing 530 the focus lens to the new media focus. The method 500 facilitates improved error rates particularly when accessing multi-layer media.

Selecting 510 coefficients to compensate for aberration includes perturbing coefficients C1-C8 to receive a minimal amount of aberration errors. In a depicted embodiment, selecting 510 coefficients C1-C8 to compensate for aberration uses one of the various optimization processes discussed in conjunction with the search matrices 300. For example, selecting may begin with the second order coefficients and proceed to higher order coefficients as needed.

Subsequently the method proceeds by testing 515 for a change in the aberration compensator focal length. If the focal length has not changed, the method ends 540. If the focal length has changed, the method continues by determining 520 the media focus distance Dm. As disclosed herein the media focus distance is the distance from the focus lens to a data layer m on an optical medium. In the depicted embodiment, the focus lens is adjusted to conform to the equation $Dm=[F2*Dc-F2*Ds*F1/(Ds-F1)]/[Dc-F2-Ds*F1/(Ds-F1)]$ where Dc is a separation distance between an axial midpoint of the first and second compensation lens and the focus lens, Ds is a separation distance between the axial midpoint of the first and second compensation lens and a laser, F1 is a focal length of first and second compensation lens in combination, and F2 is a focal length of the focus lens.

Displacing 530 the focus lens to the new media focus distance may include repositioning a frame which secures the focus lens. In one embodiment, the frame is repositioned relative to the optical medium by an actuator.

Figure 6:
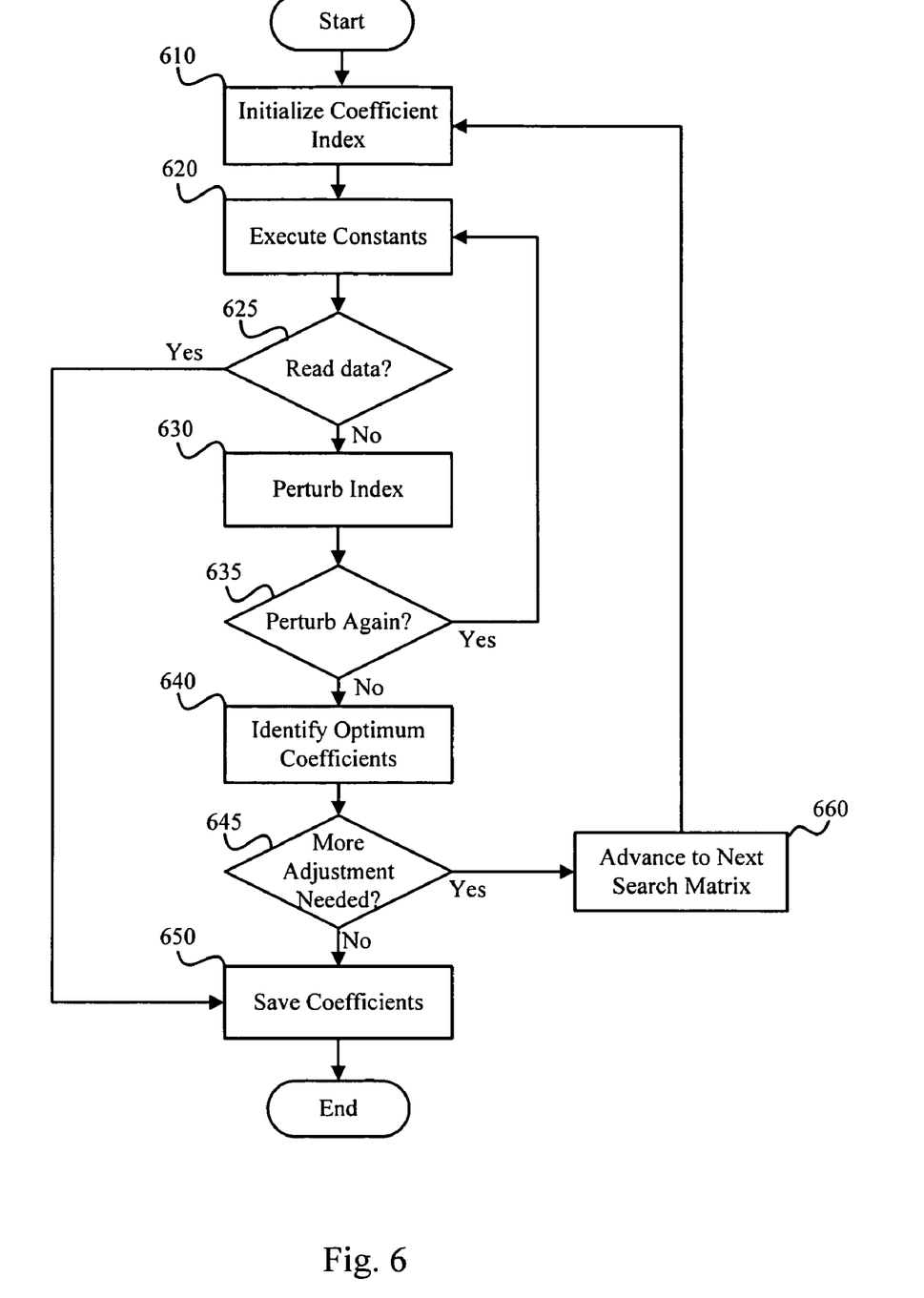
FIG. 6 is a schematic flow chart diagram illustrating one embodiment of a compensation adjustment method of the present invention.

FIG. 6 depicts of a compensation adjustment method 600. The depicted compensation adjustment method 600 includes initializing 610 the coefficient index, executing 620 the current coefficients, testing 625 for data errors, perturbing 630 the coefficient index, identifying 640 the optimum coefficients, redefining 650 the index of coefficients, and advancing 660 to the next search matrix. The compensation adjustment method 600 may be conducted in response to a read error, a calibration error, or the like. In one embodiment, the compensation adjustment method 600 is conducted in conjunction with the search matrices 300.

Initializing 610 the index of coefficients may include supplanting the current coefficients for the compensation equation with a temporary or default set of coefficients. In certain embodiments, the coefficients are not supplanted and operation 610 may be omitted. Executing 620 the current coefficients includes subjecting the currently selected coefficients to a read test. In one embodiment, the coefficients are used to generate and apply the compensation voltages corresponding to the current coefficients to their respective compensation planes.

In conjunction with the read test, the optical head may be positioned to read data from the point of error that necessitated invoking the compensation adjustment method 600. The method may continue by testing 625 for data errors in the read test. If the data can be read without errors, then further searching for coefficients may not be required and the method may advance to saving 650 the coefficients for continued usage. However, if the data cannot be read, the method continues to search for better coefficients.

Perturbing 630 the coefficients may include incrementing or decrementing one or more indices into a search matrix in order to test different coefficients. For example, if the method were using the compensation coefficients from cell 301, then perturbing 630 the coefficients would move the center cell 301 to an adjacent cell such as cell 302 or 303 (See FIG. 3). In one embodiment, the index values into a search matrix are randomly perturbed. In another embodiment, the perturbation continues in a selected direction until the error rate increases whereupon a different search direction is selected.

The perturb again test 635 ascertains whether additional perturbations may be useful. If so, the method loops to the execute constants operation 620. If not, the method advances to identifying 640 the optimum coefficients. Identifying 640 the optimum coefficients includes ascertaining which perturbed coefficients produced the best. If the results are satisfactory, a flag may be set indicating that additional adjustment is not needed.

The more adjustment needed test 645 ascertains if additional adjustment to the compensation coefficients is needed. If additional compensation is needed, the method advances 660 to the next (higher ordered) search matrix. If additional compensation is not needed the method continues by saving 650 the optimized coefficients. Subsequently, the method ends 670.

The present invention provides improved aberration compensation particularly with multi-layered optical media. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first compensation lens comprising a plurality of electrodes interleaved with a plurality of compensation planes comprising a material having a variable index of refraction;
   each compensation plane of the plurality of compensation planes having a refractive index that varies according to compensation voltages applied to electrodes adjacent to the compensation plane;
   a voltage source configured to provide a plurality of compensation voltages to the first compensation lens;
   wherein the compensation voltages are a function of a compensation plane index i (where i=1 to N) and wherein the compensation voltages substantially conform to an $N^{th}$ order compensation equation comprising coefficients corresponding to even powers of the compensation plane index i in the compensation equation and wherein all coefficients that correspond to odd powers of the compensation index i are substantially equal to zero, the compensation voltages corresponding to the coefficients of the even powers of the compensation plane index i;
   a second compensation lens comprising a plurality of electrodes interleaved with a plurality of compensation planes, the second compensation lens substantially coaxial to the first compensation lens, wherein the compensation planes of the second compensation lens are substantially perpendicular to the compensation planes of the first compensation lens;
   an optimization module configured to optimize coefficients of the Nth order compensation equation to determine the compensation voltages for the first compensation lens by initializing the coefficients, executing the coefficients, testing for data errors, perturbing the coefficients, and identifying optimum coefficients, each coefficient perturbed based on a search matrix corresponding to the coefficient, each search matrix comprising a coefficient and a plurality of possible offsets from the coefficient; and
   a displaceable focus lens that is positioned a distance Dm from a data layer m in an optical media.

2. The apparatus of claim 1, wherein the displaceable focus lens is positioned responsive to a change in a focal point of the first and second compensation lenses to substantially conform to an equation $Dm=[F2*Dc-F2*Ds*F1/(Ds-F1)]/[Dc-F2-Ds*F1/(Ds-F1)]$ wherein Dc is a separation distance between an axial midpoint of the first and second compensation lenses and the focus lens, Ds is a separation distance between the axial midpoint of the first and second compensation lenses and a laser, F1 is a focal length of the first and second compensation lenses in combination and F2 is a focal length of the focus lens.

3. The apparatus of claim 1, wherein the $N^{th}$ order compensation equation is a discrete equation, and wherein the $N^{th}$ order compensation equation is selected from a group consisting of a second order equation, a fourth order equation, a sixth order equation, and an eighth order equation.

4. The apparatus of claim 1, wherein the optimization module is further configured to increase the order of the $N^{th}$ order compensation equation to reduce aberration error.

5. The apparatus of claim 1, wherein the optimization module is further configured to adjust the $N^{th}$ order compensation equation in response to access or verification errors.

6. The apparatus of claim 1, further comprising a transparent spacer configured to separate the first compensation lens from the second compensation lens in a substantially parallel manner.

7. A system comprising:
   a displaceable focus lens;
   an optical medium, the displaceable focus lens positioned a distance Dm from a data layer m in the optical medium;
   a first compensation lens comprising a plurality of electrodes interleaved with a plurality of compensation planes comprising a material having a variable index of refraction;
   each compensation plane of the plurality of compensation planes having a refractive index that varies according to compensation voltages applied to electrodes adjacent to the compensation plane;
   a voltage source configured to provide a plurality of compensation voltages to the first compensation lens;
   wherein the compensation voltages are a function of a compensation plane index i (where i=1 to N) and wherein the compensation voltages substantially conform to an $N^{th}$ order compensation equation comprising coefficients corresponding to even powers of compensation plane index i in the compensation equation and wherein all coefficients that correspond to odd powers of the compensation index i are substantially equal to zero, the compensation voltages corresponding to the coefficients of the even powers of the compensation plane index i;
   a second compensation lens comprising a plurality of electrodes interleaved with a plurality of compensation planes, the second compensation lens substantially coaxial to the first compensation lens, wherein the compensation planes of the second compensation lens are substantially perpendicular to the compensation planes of the first compensation lens; and
   an optimization module configured to optimize coefficients of the Nth order compensation equation to determine the compensation voltages for the first compensation lens by initializing the coefficients, executing the coefficients, testing for data errors, perturbing the coefficients, and identifying optimum coefficients, each coefficient perturbed based on a search matrix corresponding to the coefficient, each search matrix comprising a coefficient and a plurality of possible offsets from the coefficient.

8. The system of claim 7, wherein the displaceable focus lens is positioned responsive to a change in a focal point of the first and second compensation lenses to substantially conform to an equation Dm=[F2*Dc−F2*Ds*F1/(Ds−F1)]/[Dc−F2−Ds*F1/(Ds−F1)] wherein Dc is a separation distance between an axial midpoint of the first and second compensation lenses and the focus lens, Ds is a separation distance between the axial midpoint of the first and second compensation lenses and a laser, F1 is a focal length of the first and second compensation lenses in combination and F2 is a focal length of the focus lens.

9. The system of claim 7, wherein the optimization module is further configured to increase an order of the $N^{th}$ order compensation equation and to perturb coefficients corresponding to the increased order to reduce aberration error.

10. A method comprising:
    providing a first compensation lens comprising a plurality of electrodes interleaved with a plurality of compensation planes comprising a material having a variable index of refraction;
    each compensation plane of the plurality of compensation planes having a refractive index that varies according to compensation voltages applied to electrodes adjacent to the compensation plane;
    providing a voltage source configured to provide a plurality of compensation voltages to the first compensation lens;
    wherein the compensation voltages are a function of a plane index i (where i=1 to N) and wherein the compensation voltages substantially conform to an $N^{th}$ order compensation equation comprising coefficients corresponding to even powers of compensation plane index i in the compensation equation and wherein all coefficients that correspond to odd powers of the compensation index i are substantially equal to zero, the compensation voltages corresponding to the coefficients of the even powers of the compensation plane index i;
    providing a second compensation lens comprising a plurality of electrodes interleaved with a plurality of compensation planes, the second compensation lens substantially coaxial to the first compensation lens, wherein the compensation planes of the second compensation lens are substantially perpendicular to the compensation planes of the first compensation lens; and
    optimizing coefficients of the Nth order compensation equation to determine the compensation voltages for the first compensation lens by initializing the coefficients, executing the coefficients, testing for data errors, perturbing the coefficients, and identifying optimum coefficients, each coefficient perturbed based on a search matrix corresponding to the coefficient, each search matrix comprising a coefficient and a plurality of possible offsets from the coefficient.

11. The method of claim 10, further comprising computing a discrete $N^{th}$ order compensation equation selected from a group consisting of a second order equation, a fourth order equation, a sixth order equation, and an eighth order equation.

12. The method of claim 10, further comprising increasing an order of the $N^{th}$ order compensation equation to reduce aberration error.

13. The method of claim 10, further comprising positioning a displaceable focus lens responsive to a change in focal point of the first and second compensation lenses to substantially conform to an equation Dm=[F2*Dc−F2*Ds*F1/(Ds−F1)]/[Dc−F2−Ds*F1/(Ds−F1)] wherein Dc is a separation distance between an axial midpoint of the first and second compensation lenses and the displaceable focus lens, Ds is a separation distance between the axial midpoint of the first and second compensation lenses and a laser, F1 is a focal length of the first and second compensation lenses in combination and F2 is a focal length of the focus lens.

* * * * *